US011958482B2

(12) United States Patent
Rudenko et al.

(10) Patent No.: US 11,958,482 B2
(45) Date of Patent: Apr. 16, 2024

(54) METHOD FOR PREDICTING AT LEAST ONE FUTURE VELOCITY VECTOR AND/OR A FUTURE POSE OF A PEDESTRIAN

(71) Applicant: Robert Bosch GmbH, Stuttgart (DE)

(72) Inventors: Andrey Rudenko, Stuttgart (DE); Luigi Palmieri, Leonberg (DE); Timm Linder, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 331 days.

(21) Appl. No.: 17/266,429

(22) PCT Filed: May 3, 2019

(86) PCT No.: PCT/EP2019/061339
§ 371 (c)(1),
(2) Date: Feb. 5, 2021

(87) PCT Pub. No.: WO2020/043328
PCT Pub. Date: Mar. 5, 2020

(65) Prior Publication Data
US 2021/0309220 A1 Oct. 7, 2021

(30) Foreign Application Priority Data

Aug. 29, 2018 (DE) .......................... 102018214635.7

(51) Int. Cl.
*B60W 30/095* (2012.01)
*G06V 40/20* (2022.01)
*G08G 1/16* (2006.01)

(52) U.S. Cl.
CPC ......... *B60W 30/0956* (2013.01); *G06V 40/25* (2022.01); *G08G 1/166* (2013.01); *B60W 2554/4029* (2020.02); *B60W 2554/4042* (2020.02); *B60W 2554/4043* (2020.02);
(Continued)

(58) Field of Classification Search
CPC ........... B60W 30/095; B60W 30/0956; B60W 60/00274; B60W 2554/4029; G08G 1/166
See application file for complete search history.

(56) References Cited

U.S. PATENT DOCUMENTS 9,233,659 B2 1/2016 Rosenbaum et al.
2007/0230792 A1 10/2007 Shashua et al.
(Continued)

FOREIGN PATENT DOCUMENTS

CN 105550500 A 5/2016
CN 106663193 A 5/2017
(Continued)

OTHER PUBLICATIONS

English Translation of WO-2016045832-A1 (Year: 2016).*
(Continued)

*Primary Examiner* — Anshul Sood
(74) *Attorney, Agent, or Firm* — NORTON ROSE FULBRIGHT US LLP; Gerard A. Messina

(57) ABSTRACT

A method for predicting at least one future velocity vector and/or a future pose of a pedestrian in an area of prediction. A map of a surrounding environment of the pedestrian and current velocity vectors of other pedestrians in the area of prediction are taken into account in the prediction.

12 Claims, 4 Drawing Sheets

(52) U.S. Cl.
CPC ............ *B60W 2554/4044* (2020.02); *B60W 2554/406* (2020.02); *B60W 2554/408* (2020.02)

(56) References Cited

U.S. PATENT DOCUMENTS

| | | | |
|---|---|---|---|
| 2011/0210866 A1* | 9/2011 | David | G08G 1/166 340/901 |
| 2011/0246156 A1* | 10/2011 | Zecha | G06V 40/23 703/6 |
| 2013/0329958 A1 | 12/2013 | Oami et al. | |
| 2016/0300485 A1* | 10/2016 | Ayvaci | G06V 20/58 |
| 2019/0263398 A1* | 8/2019 | Matsunaga | G06V 20/58 |
| 2020/0047747 A1* | 2/2020 | An | B60W 10/18 |
| 2020/0211395 A1* | 7/2020 | Feist | G06V 20/58 |
| 2020/0231144 A1* | 7/2020 | Ueda | B60T 7/12 |

FOREIGN PATENT DOCUMENTS

| | | | |
|---|---|---|---|
| CN | 108320513 A | | 7/2018 |
| CN | 108428243 A | | 8/2018 |
| WO | 2015177648 A1 | | 11/2015 |
| WO | WO-2016045832 A1 * | 3/2016 | ............ G08G 1/005 |

OTHER PUBLICATIONS

International Search Report for PCT/EP2019/061339, dated Jan. 20, 2020.

D. Brscic, et al., "Person Tracking in Large Public Spaces Using 3D Range Sensors," IEEE Transactions on Human-Machine Systems, vol. 43, No. 6, 2013, pp. 1-13. <https://www.researchgate.net/profile/Drazen_Brscic/publication/264580888_Person_Tracking_in_Large_Public_Spaces_Using_3-D_Range_Sensors/links/55b5de3608ae092e96559c0f/Person-Tracking-in-Large-Public-Spaces-Using-3-D-Range-Sensors.pdf?origin=publication_detail> Downloaded Feb. 5, 2021.

V. Karasev, et al., "Intent-Aware Longterm Prediction of Pedestrian Motion." In 2016 IEEE International Conference on Robotics and Automation (ICRA), 2016, pp. 1-7. <http://www.bheisele.com/karasevAHS16.pdf> Downloaded Feb. 5, 2021.

J. Elfring, et al., "Learning Intentions for Improved Human Motion Prediction," Robotics and Autonomous Systems, vol. 62, No. 4, 2014, pp. 591-602. <https://www.techunited.nl/media/images/Kwalificatie%20materiaal%202014/Elfring_2014.pdf> Downloaded Feb. 5, 2021.

Becker Daniel, et al., "Vehicle and Pedestrian Collision Prevention System Based on Smart Video Surveillance and C2I Communication," 17th International IEEE Conference on Intelligent Transportation Systems (JTSC), IEEE, 2014, pp. 1-6. <https://www.researchgate.net/publication/286702747_Vehicle_and_pedestrian_collision_prevention_system_based_on_smart_video_surveillance_and_C2I_communication>.

Rudenko et al. "Joint Long-Term Prediction of Human Motion Using a Planning-Based Social Force Approach" 2018 IEEE International Conference on Robotics and Automation (2018); pp. 4571-4577.

Moussaid et al. "The walking behavior of pedestrian social groups and its impact on crowd dynamics" arXiv (2010); pp. 1-18.

* cited by examiner

METHOD FOR PREDICTING AT LEAST ONE FUTURE VELOCITY VECTOR AND/OR A FUTURE POSE OF A PEDESTRIAN

FIELD

The present invention relates to a method for predicting at least one future velocity vector and/or a future pose of a pedestrian in an area of prediction. In addition, the present invention relates to a computer program that carries out each step of the method, as well as to a machine-readable storage medium that stores the computer program. Finally, the present invention relates to an electronic control device that is set up to carry out the method.

BACKGROUND INFORMATION

In order to prevent a collision of self-driving vehicles or robots with pedestrians, methods are used that predict future velocity vectors and poses of pedestrians.

In U.S. Pat. No. 9,233,659 B2, a collision warning system is described that uses a camera mounted on a vehicle and a processor. A warning of a collision of the vehicle with a pedestrian is issued on the basis of a change in size of an image of the pedestrian acquired by the camera. For further validation of the warning, temporal changes of the image and of roadway markings acquired in the image are taken into account. Here, a lateral movement of the pedestrian can be recognized if the pedestrian passes a roadway marking or a curb edge.

In PCT Application No. WO 2015/177648 A1, a method is described for detecting pedestrians that can recognize pedestrians and images. Here it is evaluated whether there is a risk of the pedestrian colliding with a vehicle. For this purpose, a future position of the pedestrian and of the vehicle is extrapolated from their respective direction of movement and speed.

U.S. Patent Application Publication No. US2007/0230792 A1 describes a method with which it can be recognized whether a pedestrian could move into the area of travel of vehicle. For this purpose, pedestrians are identified in images recorded by a camera. These pedestrians are classified by comparing their location and their trajectory with the course of a curb edge. If the classification yields the result that the pedestrian is on the roadway, a collision warning is issued.

SUMMARY

In accordance with an example embodiment of the present invention, a method for predicting at least one future velocity vector and/or a future pose of a pedestrian in an area of prediction provides that, in the prediction, not only data about the relevant pedestrian, but also a static map of the area of prediction and current velocity vectors of other pedestrians in the area of prediction are taken into account in the prediction. In order to enable effective prevention of a collision with a pedestrian, it is necessary to know not only the pedestrian's current position and current velocity vector, which can be acquired by sensors, but also to predict how the velocity vector and the pose of the pedestrian will change in the future in order to enable timely issuing of a collision warning. In particular when the method is used to avoid collision of a self-driving vehicle moving at high speed with a pedestrian, it is not sufficient to know information about the pedestrian's current location and current direction of movement and speed. Future changes in the pedestrian's velocity vector may have the result that a situation previously assessed as not dangerous will change to a potential collision scenario. In this case, sufficient time still has to be available to brake the vehicle or to initiate an evasive maneuver before a collision with the pedestrian occurs.

While methods from the related art take into account only future changes of the velocity vector based on stationary obstacles in a stationary map, or social information, without information about the surrounding environment, the present method provides that both a map and the movement of other pedestrians are included in the prediction. These are regarded in particular not merely as mobile obstacles; rather, further interactions between the pedestrians can also be included in the prediction.

Preferably, for the prediction pedestrians in the area of prediction are combined into groups. From current poses and current velocity vectors of all members of a group, a current pose and a current velocity vector of the group can be ascertained. Pedestrians are combined to form a group in particular when it can be derived, from their current velocity vectors, that they are moving as a group. This conclusion is drawn in particular if the velocity vectors of all group members differ from one another by a maximum of a prespecified threshold. It facilitates the carrying out of the method on an electronic computing device or control device if all group members can be treated in uniform fashion in the prediction, using a common pose and a common velocity vector.

In addition, it is preferred that social interactions between the pedestrians be taken into account in the prediction. In the case of pedestrians that are members of a common group, such social interactions may in particular be attractive interactions that have the result that the members of the group never move further than a specifiable distance from a midpoint of the group, from the next group member, or from the leader of the group. This can have the result that the group members, if they have to move around an obstacle, do not choose the shortest possible path, but rather choose a longer path along which the coherence of the group remains ensured. Social interactions between pedestrians who are not part of a group may also be relevant for the prediction. Thus, for example a pedestrian may briefly stand still in order to let another pedestrian pass, or may move around this other pedestrian. A social interaction in such an evasive movement can also in particular be that it is not the case that one of the pedestrians continues his/her path undisturbed while the other moves out of the way, but rather that both carry out an evasion maneuver.

In addition, it is preferred that a destination be assigned to each pedestrian. This assignment can be made in particular on the basis of the pedestrian's current velocity vector. In the prediction, it is taken into account that the pedestrian is moving towards this destination. Even if the pedestrian is temporarily led away from the immediate path to this destination, for example by social interactions within a group or by interactions with pedestrians who are not part of the group, or by other factors such as stationary obstacles, in the prediction it is nonetheless assumed that over the long term the pedestrian will always return to a path to this destination.

Preferably, the prediction is carried out in a plurality of temporal substeps. In each of these substeps, all values taken into account in the prediction of the velocity vectors are recalculated. Such values are for example velocity vectors and poses of other pedestrians, and the social interactions with each of these pedestrians. In this way, in each time substep a prediction is obtained, the predictions of the first substeps still being very accurate, and the accuracy decreasing the further the prediction extends into the future.

In each of the substeps, a future pose of the pedestrian can be ascertained. From all ascertained future poses, it is in particular possible to create a movement map of the pedestrian that can be used for the planning of the movement of a self-driving vehicle or of a robot.

Current poses and current velocity vectors of the pedestrians can in particular be ascertained using at least one sensor that is selected from the group made up of monocular sensors, stereo sensors, and depth sensors. As depth sensor, for example a lidar sensor or an RGB-D camera is suitable.

The result of the prediction is used in particular to control a self-driving vehicle or a robot in such a way that a collision with the pedestrian is avoided. Here the area of prediction is preferably selected such that it corresponds to an area through which the vehicle or the robot will move in the future.

In accordance with an example embodiment of the present invention, a computer program is set up to carry out each step of the method in particular when it is run on a computing device or on an electronic control device. In particular, it has a prediction module having a movement plan, tracklets, and social context information that are used for the prediction. It enables the implementation of various specific embodiments of the method in an electronic control device without having to carry out constructive modifications to the device. For this purpose, it is stored on the machine-readable storage medium.

By running the computer program on a conventional electronic control device, the electronic control device is obtained that is set up to predict a future velocity vector and/or a future pose of a pedestrian using the method. In particular, the electronic control device is in addition set up to control a self-driving vehicle and/or a robot in such a way that a collision with a pedestrian is avoided.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
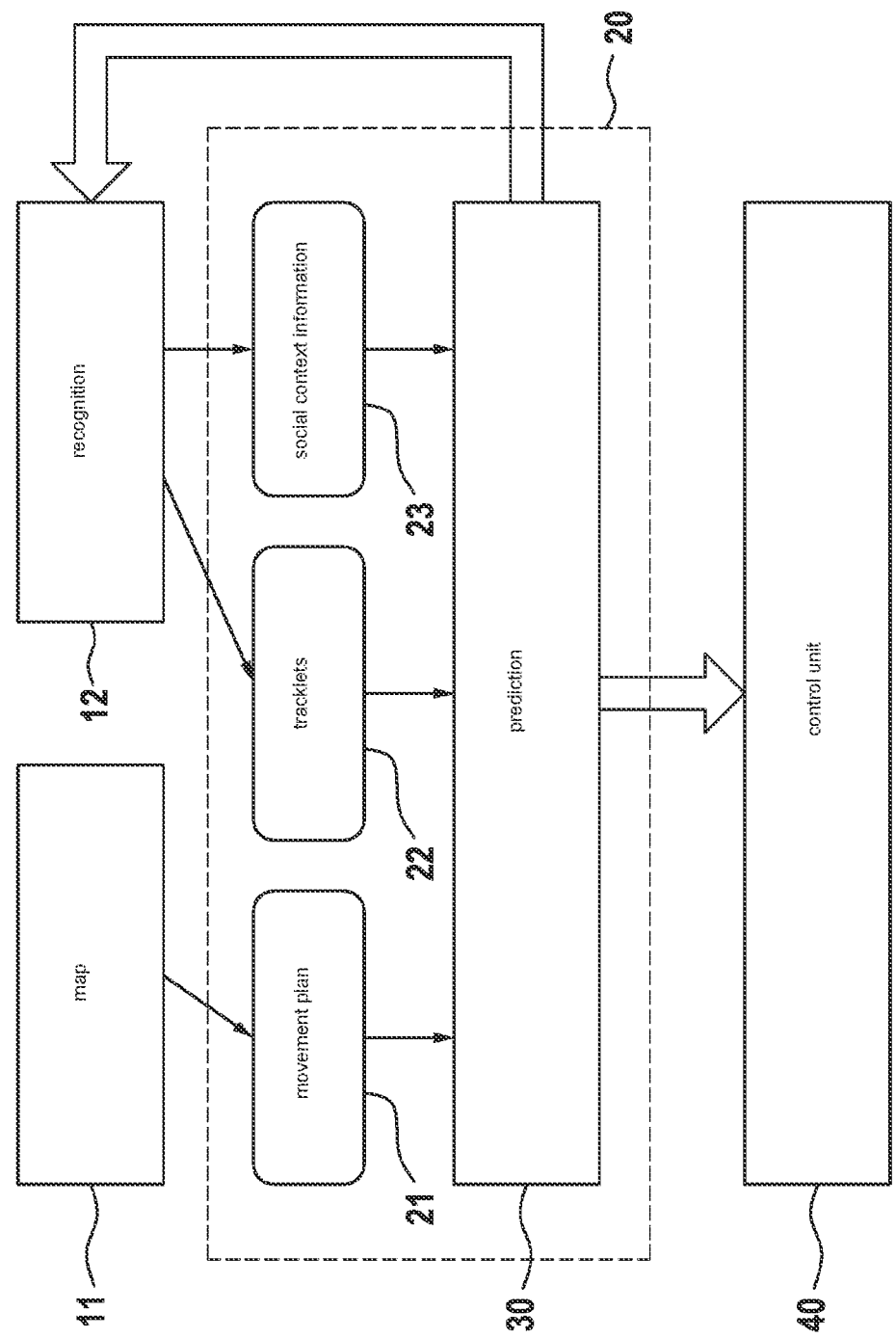
FIG. 1 schematically shows a system architecture of a self-driving vehicle that, using an exemplary embodiment of the method according to the present invention, carries out a prediction of at least one future velocity vector and of a future pose of a pedestrian.

In an exemplary embodiment of the method for predicting at least one future velocity vector and a future pose of a pedestrian in order to avoid a collision of the pedestrian with a self-driving vehicle, sensors of the vehicle create a map 11 of an area through which the vehicle will move in the future. Map 11 contains all geographical features of the area. A prediction is to be made as to whether, within this area, pedestrians could move into the path of movement of the vehicle, so that there is a risk of collision. Therefore, in the following this area is referred to as the area of prediction. Using the sensors, images of the area of prediction are created, and a recognition 12 is carried out of persons in the images. In a prediction module 20, from map 11 a movement plan 21 is now created in which it can be recognized in which segments of the area of prediction, which is not blocked by obstacles, pedestrians can move. The data acquired concerning the individual pedestrians is divided into tracklets 22 and social context information 23. Tracklets 22 acquire the current velocity vectors and the current poses of the pedestrians. Here, each velocity vector contains information about the direction of movement of a pedestrian and about his or her movement speed. The pose indicates his or her orientation. The social context information 23 is obtained through image analysis, and enables a conclusion as to which individual pedestrians are part of a group having a common destination. Movement plan 21, tracklets 22, and social context information 23 are made available for the prediction 30. The result of the prediction is on the one hand provided to a control unit 40 of the self-driving vehicle in order to avoid a collision with pedestrians. On the other hand, it is also used the next time recognition 12 is carried out of pedestrians in the recorded images, in order to facilitate this recognition 12.

Figure 2:
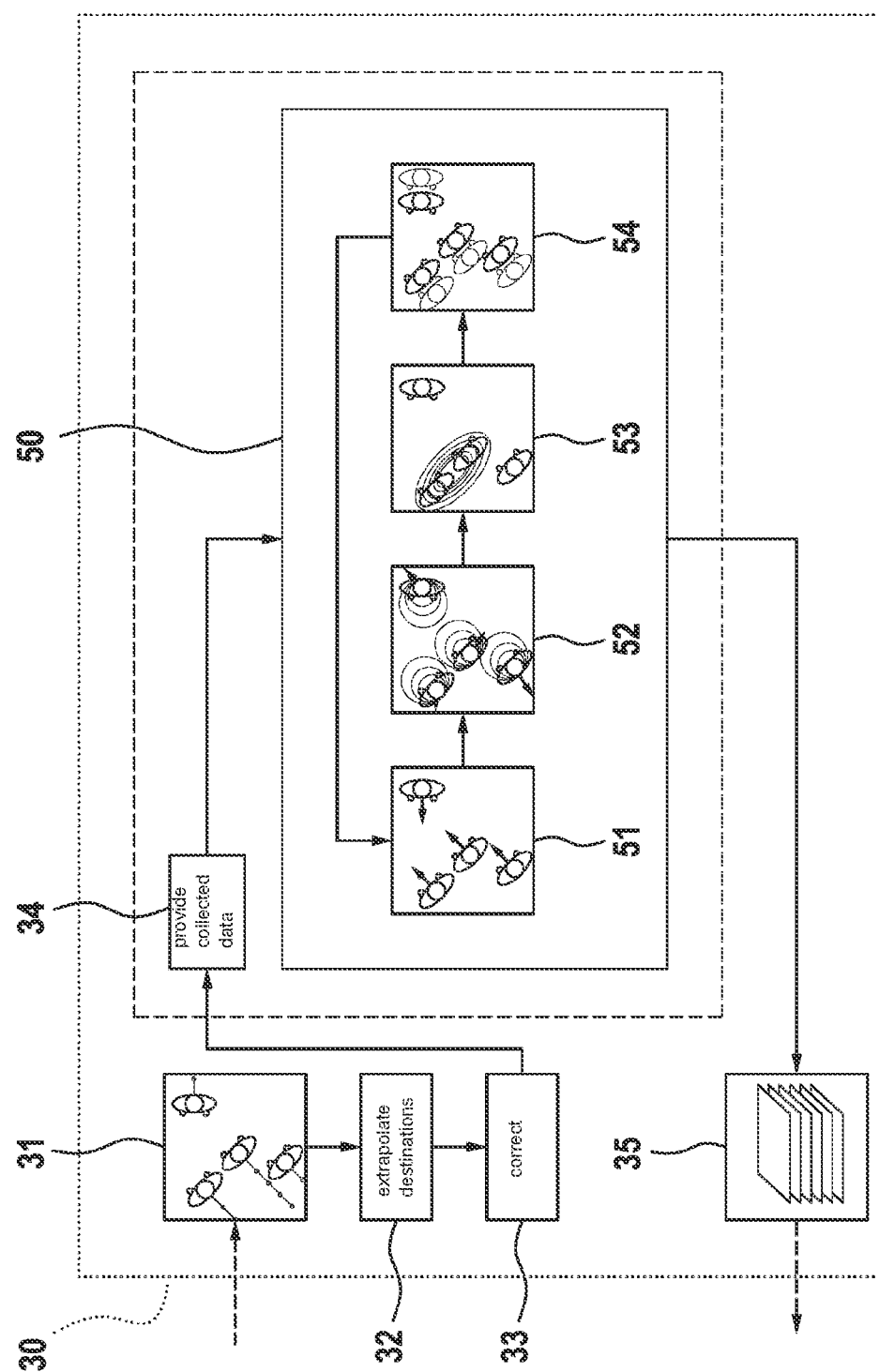
FIG. 2 schematically shows the sequence of a prediction of a future velocity vector and of a future pose of a pedestrian in an exemplary embodiment of the method according to the present invention.

FIG. 2 shows in detail how prediction 30 runs. In a step 31, movement plan 21, tracklets 22, and social context information 23 are acquired, individual pedestrians being combined into groups on the basis of the social context information 23. In the next step 32, the destinations of the pedestrians are extrapolated on the basis of their current velocity vectors. For this purpose, a plurality of possible movement routes and destinations of the pedestrians are taken into account. In the next step 33, these are corrected, using movement plan 21, in such a way that only destinations remain that are plausible on the basis of map 11. The collected data about current velocity vectors, current poses, and destinations of each pedestrian are provided to a prediction function 50 in the next step 34. This has four substeps. In a first substep 51, it is ascertained which path each pedestrian can be expected to select in the area of prediction in a specified time interval, based on his or her destination, current velocity vector, and current pose. In a second substep 52, this path is corrected by taking into account social interactions of each pedestrian with adjacent pedestrians. These social interactions represent probable paths of avoidance of collision with other pedestrians, based on typical movement patterns of pedestrians. In a third substep 53, a new correction is carried out based on social interactions between group members. The social interactions influence the movement in such a way that groups are not broken up. In a fourth substep 54, based on the results of the first three substeps 51, 52, 53, the current poses and current velocity vectors are replaced with predicted future poses and future velocity vectors at the end of the time interval. The future poses ascertained in this way are entered in a movement map 35, and there they are linked with the time interval on which the prediction is based. Substeps 51 through 54 are then carried out again, the future velocity vectors and future poses of the pedestrians ascertained in step 54 now being used instead of the current velocity vectors and current poses provided from step 34. However, the destinations of the pedestrians from step 34 are retained. Each time substeps 51 through 54 are run through, another entry is created in movement map 35 for a new time interval. Movement map 35 is finally provided to control unit 40, so that this control unit can read out, for each time interval, the most probable locations of all persons in the area of prediction.

Figure 3:
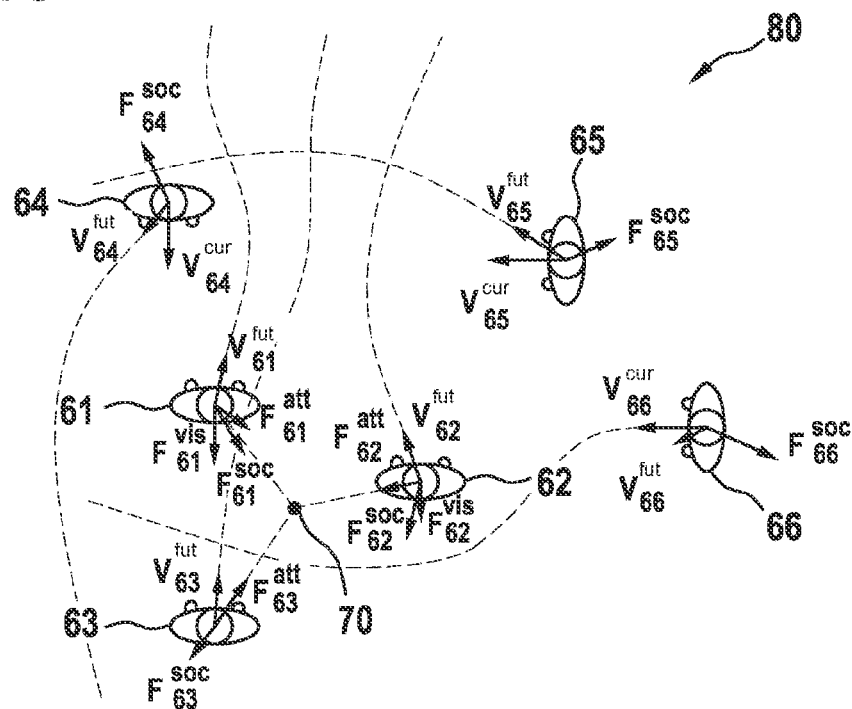
FIG. 3 schematically shows social interactions between a plurality of pedestrians that, in an exemplary embodiment of the method according to the present invention, are used for the prediction of at least one future velocity vector and of a future pose of a pedestrian.

The sequence of substeps 51 to 53 is further illustrated in FIG. 3. There, the movement of six persons 61 through 66 is shown. The first three persons 61 through 63 form a group. This group is grouped around a midpoint 70. In area of prediction 80, the members of the group are currently moving vertically upward in FIG. 3. The current velocity vectors $v_{64-66}^{cur}$ of the further pedestrians 64 through 66 are shown by arrows in FIG. 3. Inside the group, attractive social interactions $F_{61-63}^{att}$ act on the group members, through which these numbers move towards midpoint 70. These attractive social interactions $F_{61-63}^{att}$ can be calculated for each pedestrian i according to Equation 1:

$$F_i^{att} = \alpha \cdot U_i \cdot q \quad \text{(Equation 1)}$$

Here, $\alpha$ designates the strength of a group attraction effect, and $U_i$ is a unit vector that points from pedestrian i to midpoint 70. Value q is a threshold value that indicates whether the attractive social interaction is acting or not. If the distance between pedestrian i and midpoint 70 is below the threshold value, then $F_i^{att}=0$. The group attraction effect is thus acting only if pedestrian i is moving away from midpoint 70 by more than the threshold value.

Further social interactions $F_{61-62}^{vis}$ have the result that the first two pedestrians 61, 62 of the group reduce their speed so that third pedestrian 63 will not lose the connection to the group. These further social interactions $F_{61-62}^{vis}$ can be calculated for each pedestrian i according to Equation 2:

$$F_i^{vis} = \beta \cdot v_i^{cur} \cdot \gamma_i \quad \text{(Equation 2)}$$

Here, $\beta$ designates the strength of an interaction within the group. The angle between the current velocity vector $v_i^{cur}$ of pedestrian i and his or her direction of view is designated $\gamma_i$.

A further movement of all pedestrians 61 through 66 along their current velocity vectors is not possible without a collision occurring. Therefore, repelling social interactions $F_{61-66}^{soc}$ act, which move each of the pedestrians 61 through 66 so as to avoid the other pedestrians. These repelling social interactions $F_{i,j}^{soc}$ can be calculated, for each pedestrian i relative to another pedestrian j, according to Equation 3:

$$F_{i,j}^{soc} = a_j \cdot e^{\frac{r_{i,j}-d_{i,j}}{b_j}} \cdot n_{i,j} \cdot \left(\lambda + (1-\lambda) \cdot \frac{1+\cos\varphi_{i,j}}{2}\right) \quad \text{(Equation 3)}$$

Here $a_j \geq 0$ designates the strength and $b_j > 0$ designates the direction of the repellent social interaction. The distance between the two pedestrians i, j is designated $d_{i,j}$, and $r_{i,j}$ designates the sum of their radii. An anisotropy factor $\lambda \in [0, 1]$ scales the repelling social interaction in the direction of the movement of pedestrian i. The interaction reaches its maximum value when the angle $\varphi_{i,j}$ between a normalized vector $n_{i,j}$, which points from pedestrian i to pedestrian j, and the current velocity vector $v_i^{cur}$ of pedestrian i is zero. It assumes its minimum when $\varphi_{i,j}=\pi$.

Taking all these factors into account, future velocity vectors $v_{61-66}$ of pedestrians 61 through 66 are ascertained that differ from their current velocity vectors. The future movement of all pedestrians 61 through 66 is shown by broken lines. It will be seen that the future velocity vectors $v_{61-66}^{fut}$ will change over the individual time intervals in such a way that each pedestrian 61 through 66, after passing the other pedestrians, will again move towards his or her original destination.

Figure 4:
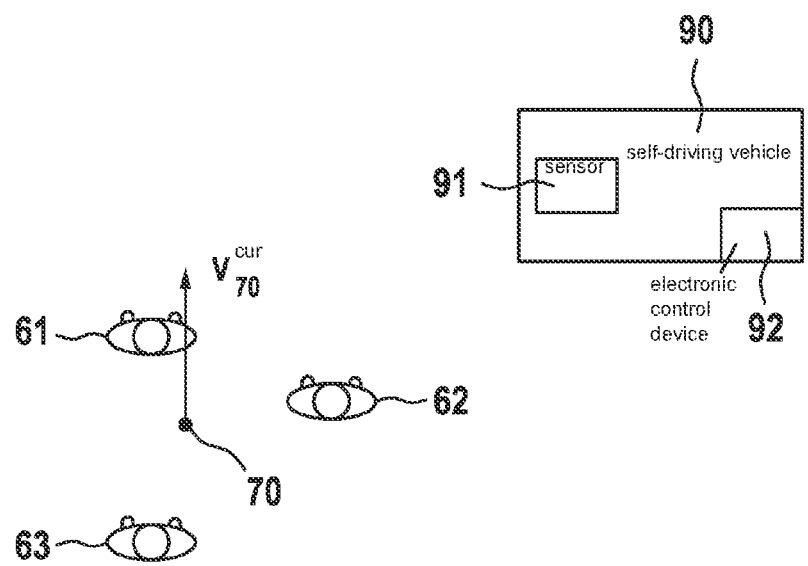
FIG. 4 schematically shows the movement of a group of pedestrians relative to a self-driving vehicle, in a method according to an exemplary embodiment of the present invention.
Figure 5:
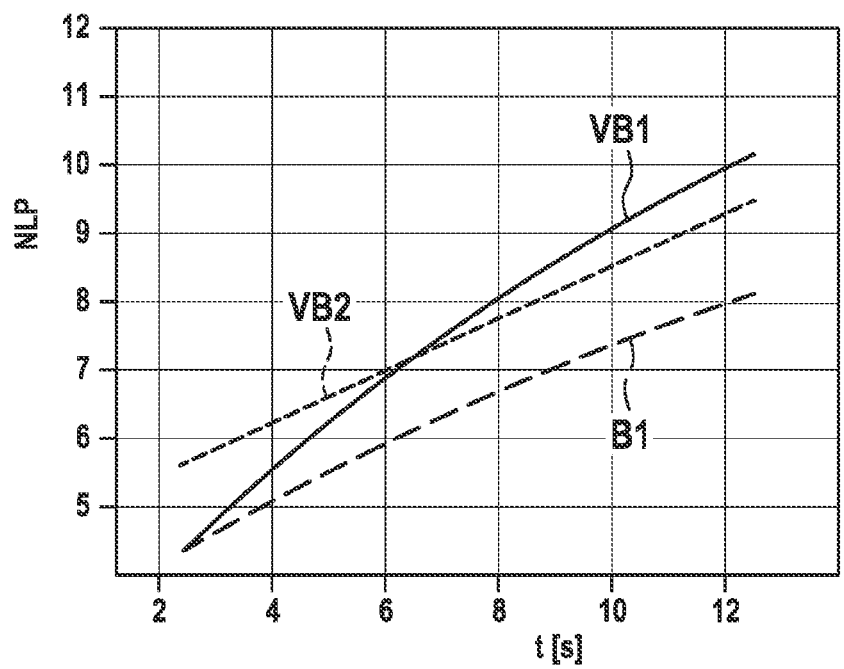
FIG. 5 shows, in a diagram, the negative log probability as a function of the prediction duration in simulations according to comparative examples and an exemplary embodiment of the present invention.

FIG. 4 shows how the current movement of pedestrians 61 through 63, who are members of the group, can be represented by a common current velocity vector $v_{70}^{cur}$ that goes out from midpoint 70 of the group. A self-driving vehicle 90, which, in the situation shown in FIG. 4, has planned a horizontal movement to the left, can recognize pedestrians 61 through 63 using a sensor 91, here realized as an RGB-D camera. In its electronic control device 92, using the method according to the present invention the vehicle predicts the movement of the group members in order to adapt its direction of movement, in order to reduce its speed if warranted, or in order to stop, and thus to avoid a collision with the group members. Further pedestrians, who themselves could not move into the direction of movement of vehicle 90, are nonetheless acquired by sensor 91 and are taken into account in the prediction, because they may influence the future movement of the group members through social interactions.

Based on the simulated environment of the ATC department store in Osaka, Japan, described in D. Brscic, T. Kanda, T. Ikeda, T. Miyashita, "Person position and body direction tracking in large public spaces using 3D range sensors," IEEE Transactions on Human-Machine Systems, Vol. 43, No. 6, pp. 522-534, 2013, a prediction B1 according to the present invention, and to predictions according to comparative examples VB1, VB2, were carried out. For comparative example VB1, a prediction method was used according to V. Karasev, A. Ayvaci, B. Heisele, S. Soatto, "Intent-aware longterm prediction of pedestrian motion," in 2016 IEEE International Conference on Robotics and Automation (ICRA), May 2016. In this prediction method, a map 11 of area of prediction 80 is taken into account. However, current velocity vectors ($v_{61-66}^{cur}$) of further pedestrians 61-66 in area of prediction 80 are not taken into account in the prediction. For comparative example VB2, a prediction method was used according to J. Elfring, R. Van De Molengraft, M. Steinbuch, "Learning intentions for improved human motion prediction," Robotics and Autonomous Systems, vol. 62, no. 4, pp. 591-602, 2014. In this method, current velocity vectors ($v_{61-66}^{cur}$) of further pedestrians 61-66 in area of prediction 80 are taken into account in the prediction. However, no map 11 of area prediction 80 is taken into account.

Figure 6:
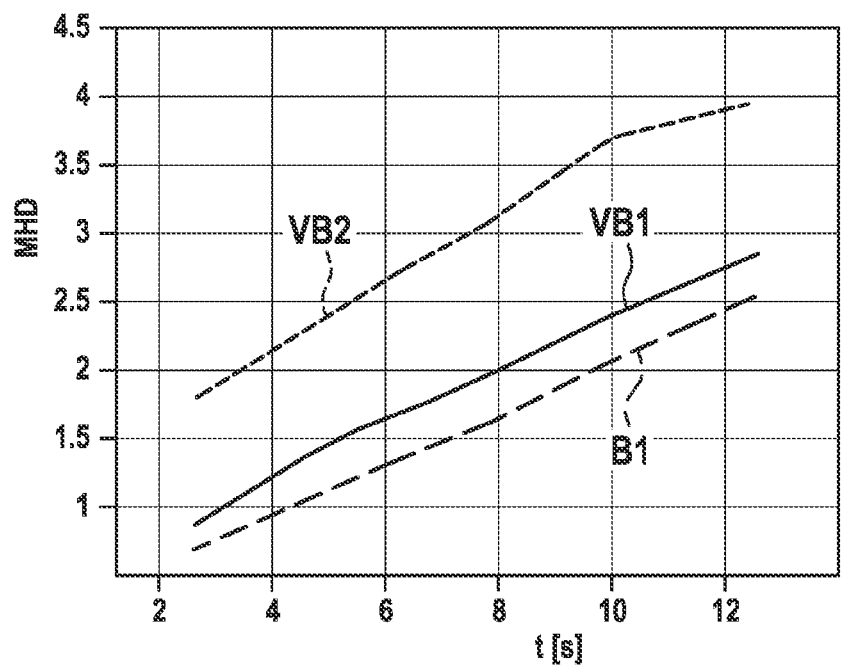
FIG. 6 shows, in a diagram, the modified Hausdorff distance as a function of the prediction duration in simulations according to comparative examples and an exemplary embodiment of the present invention.

In Example B1 according to the present invention, and in the comparative examples VB1, VB2, 21 scenarios were simulated with a total of 172 persons, of which 90 pedestrians were in groups, having a total of 15 different possible destinations. A prediction was made over a time period t of 12 seconds. The average negative log probability NLP obtained in the respective simulations is shown in FIG. 6, and the average modified Hausdorff distance MHD obtained is shown in FIG. 7. It can be seen that the method according to the present invention supplies lower values for NLP and MHD than do comparative examples VB1, VB2. Consequently, the method according to the present invention is more accurate.

What is claimed is:

1. A method for predicting at least one future velocity vector and/or a future pose of a pedestrian of a plurality of pedestrians in a prediction area, the method comprising:
predicting the at least one future velocity vector and/or future pose of the pedestrian;
taking into account, in the prediction, a map of the prediction area and current velocity vectors of further pedestrians of the plurality of pedestrians in the prediction area; and
using a result of the prediction to control a self-driving vehicle or a robot in such a way that a collision with the pedestrian is avoided, wherein social interactions between at least some of pedestrians belonging to the plurality of pedestrians in the prediction area are taken into account in the prediction, wherein the plurality of pedestrians are members of a common group such that the social interactions are attractive interactions according to which members of the common group do not move further than a specifiable distance from a midpoint of the common group.

2. The method as recited in claim 1, wherein for the prediction, at least some of pedestrians belonging to the plurality of pedestrians in the prediction area are combined into groups, a current pose and a current velocity vector of the each group being ascertained from current poses and current velocity vectors of all the members of the group.

3. The method as recited in claim 1, wherein a respective destination is assigned to each of the pedestrians belonging to the plurality of pedestrians in the prediction area, and it is taken into account in the prediction that each of the pedestrians is moving towards the respective destination.

4. The method as recited in claim 1, wherein the prediction is carried out in a plurality of temporal substeps, all values taken into account in the prediction of the at least one future velocity vector being recalculated for each substep.

5. The method as recited in claim 4, wherein in each of the substeps, the future pose of the pedestrian is ascertained, and from all ascertained future poses, a movement map of the pedestrian is created.

6. The method as recited in claim 1, wherein current poses and current velocity vectors of the pedestrians belonging to the plurality of pedestrians in the prediction area are ascertained using at least one sensor, the at least one sensor including at least one of the following: a monocular sensor, and/or a stereo sensor, and/or a depth sensor.

7. The method as recited in claim 1, wherein at least one of the social interactions represents at least one probable path of avoidance of collision between the pedestrian and another pedestrian belonging to the plurality of pedestrians, based on at least one pedestrian movement patterns.

8. A non-transitory machine-readable storage medium on which is stored a computer program for predicting at least one future velocity vector and/or a future pose of a pedestrian of a plurality of pedestrians in a prediction area, the computer program, when executed by a computer, causing the computer to perform:
predicting the at least one future velocity vector and/or the future pose of the pedestrian;
taking into account, in the prediction, a map of the prediction area and current velocity vectors of further pedestrians of the plurality of pedestrians in the prediction area; and
using a result of the prediction to control a self-driving vehicle or a robot in such a way that a collision with the pedestrian is avoided, wherein social interactions between at least some of pedestrians belonging to the plurality of pedestrians in the prediction area are taken into account in the prediction, wherein the plurality of pedestrians are members of a common group such that the social interactions are attractive interactions according to which members of the common group do not move further than a specifiable distance from a midpoint of the common group.

9. The non-transitory machine-readable storage medium as recited in claim 8, wherein the computer program includes a prediction module having a movement plan, tracklets, and social context information, which are used for the prediction.

10. The non-transitory machine-readable storage medium as recited in claim 8, wherein at least one of the social interactions represents at least one probable path of avoidance of collision between the pedestrian and at least one other pedestrian belonging to the plurality of pedestrians, based on at least one pedestrian movement patterns.

11. An electronic control device configured to predict at least one future velocity vector and/or a future pose of a pedestrian of a plurality of pedestrians in a prediction area, the electronic control device configured to:
predict the at least one future velocity vector and/or the future pose of the pedestrian; and
take into account, in the prediction, a map of the prediction area and current velocity vectors of further pedestrians of the plurality of pedestrians in the prediction area, wherein the electronic control device is further configured to control a self-driving vehicle or a robot, in such a way that a collision with the pedestrian is avoided, wherein social interactions between at least some of pedestrians belonging to the plurality of pedestrians in the prediction area are taken into account in the prediction, wherein the plurality of pedestrians are members of a common group such that the social interactions are attractive interactions according to which members of the common group do not move further than a specifiable distance from a midpoint of the common group.

12. The electronic control device as recited in claim 11, wherein at least one of the social interactions represents at least one probable path of avoidance of collision between the pedestrian and at least one other pedestrian belonging to the plurality of pedestrians, based on at least one pedestrian movement patterns.

\* \* \* \* \*